April 10, 1928.

C. E. WAREAM 1,665,762

WELDED SPRING PAD AND METHOD OF MAKING THE SAME

Filed Jan. 23, 1926

INVENTOR
Charles E. Waream
BY Brockett & Hyde
ATTORNEYS

Patented Apr. 10, 1928.

1,665,762

UNITED STATES PATENT OFFICE.

CHARLES E. WAREAM, OF NORWOOD, OHIO, ASSIGNOR TO THE AMERICAN LAUNDRY MACHINERY COMPANY, OF NORWOOD, OHIO, A CORPORATION OF OHIO.

WELDED SPRING PAD AND METHOD OF MAKING THE SAME.

Application filed January 23, 1926. Serial No. 83,277.

This invention relates to the class of spring pads used to cover boards of ironing and pressing machines, and more particularly to the type of padding consisting of a metallic backing plate having rigidly secured thereto springs spaced closely together and held upright.

Such spring pressing pads have been constructed in a great many different ways and many of the constructions employed utilize welding as a means of securing the spring upon the plate.

Figure 1:
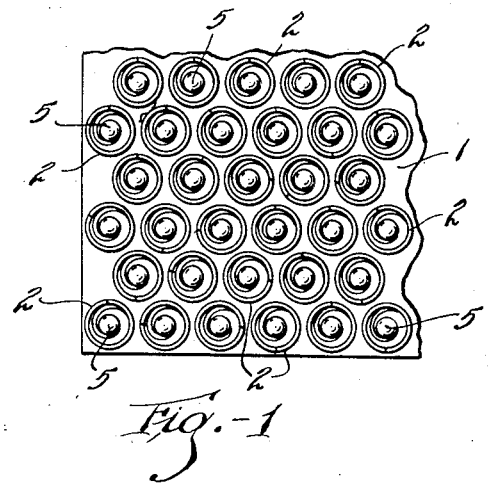
Figure 3:
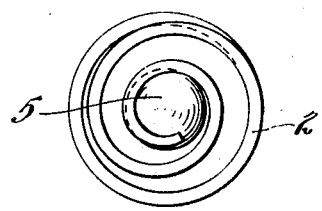
Figure 2:
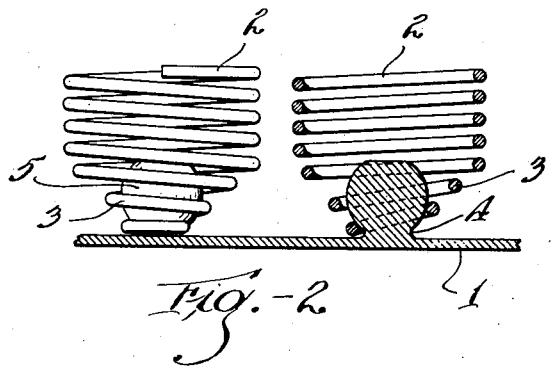
Figure 4:
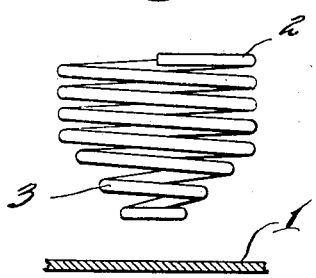

It is the object of this invention to provide a novel method whereby the springs may be welded upon the plate and to this end to provide equally novel means for the purpose; to the end that considerable saving in original cost of both labor and materials, together with an increased reliability in the resulting spring pad may be realized. The exact nature and advantages of my invention will be apparent from the following description taken in connection with the accompanying drawing in which Fig. 1 is a plan view of a portion of a spring pad showing a number of springs attached thereto according to my invention; Fig. 2 is a detail showing two of the spring units, one in section; Fig. 3 is a view looking upwardly from the bottom of the spring before securing the same to the plate; Fig. 4 shows the separate parts before assembling to form a spring unit and Fig. 5 is a detail showing the method of welding.

In the drawings 1 indicates the metallic backing plate of the pad covered as shown, with numerous closely spaced spring units two of which appear in detail in Fig. 2. The springs, 2, employed are generally helical compression springs, but the terminating few convolutions of each are diminished in diameter to form an open ended cone-like termination of the spring as indicated at 3. Upon the plate centrally of each spring is a substantially spherical projection 4 made integral with the plate in the manner to be described; and the terminating convolution of the cone-like end of the spring engages the neck formed at the conjunction with the projection with the plate to retain the spring in the position shown in Figs. 1 and 2.

Figure 5:
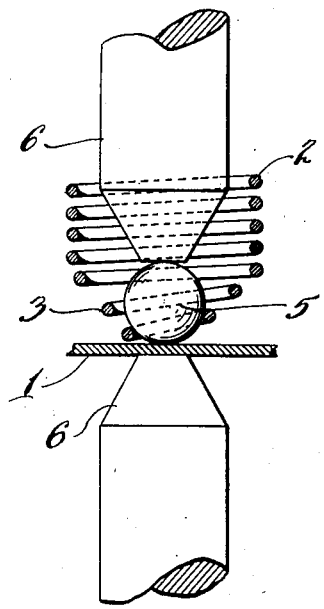

In so securing each of the springs upon the plate a metallic object preferably spherical as the ball 5 is employed, of such size with respect to the smallest convolutions of the spring as to take the approximate position shown in Fig. 5 when dropped into the spring and allowed to rest with it upon the plate 1. In practice the spring is properly positioned upon the plate by any suitable means not shown and having no further connection with this invention, and the ball 5 is dropped into the spring, the lower convolutions of which by their conical conformation guide it to the position shown.

Maintaining the described relative position of the parts welding electrodes 6 are next applied as shown, with the requisite pressure and current flow to accomplish a weld between the ball 5 and the plate 1, whereupon the former ball now becomes a substantially integral projection 4 upon the plate, and the spring is tightly held in its initial position by engagement with the projection as clearly appearing in Fig. 2.

It has been found in practice that this method of securing the springs results in a very considerable saving in labor of securing means heretofore employed, owing to the automatic positioning of the ball 5 by the conical spring conformation employed, it being only necessary for the welding operator to drop the ball into the large end of the spring. Moreover, the securing means approximates in result, a universal connection allowing each spring a freer play in any direction than is possible with any of the securing means heretofore employed. It is obvious that the highest degree of reliability is ensured by the large area of the weld and yet the relative area of the backing plate made inflexible by the weld is small compared with that in other means now employed. This is important as a certain amount of "give" in the backing plate is necessary.

What I claim is:

1. The method of securing a spring with tapering end coils to a base plate, consisting in applying within the tapering end coils a member having a convex curved lower surface, adapted to engage said coils and permanently securing said member to the plate.

2. The method of securing a spring with tapering end coils to a base plate, consisting in applying within the tapering end coils a member having a convex curved lower surface and permanently securing said member to the plate by a welding operation.

3. The method of securing a spring having terminal tapering coils to a base plate, consisting in applying a ball within the terminal tapering coils and welding the same to the plate.

4. A spring pad, comprising a metal base plate, and a series of springs secured thereto, each spring having tapering terminal convolutions, and a member within said convolutions and permanently secured to the plate and having a curved lower surface beneath which said tapering spring convolutions are engaged.

5. A spring pad, comprising a metal base plate, and a series of springs secured thereto, each spring having tapering terminal convolutions, and a member within said convolutions and welded to the plate and having a curved lower surface beneath which said tapering spring convolutions are engaged.

6. A spring pad, comprising a base plate, and a series of springs secured thereto, each spring having tapering terminal convolutions, and a spherical member within said tapering convolutions and permanently secured to the base plate.

7. A spring pad, comprising a base plate, and a series of springs secured thereto, each spring having tapering terminal convolutions, and a spherical member within said tapering convolutions and permanently secured to the base plate by a welding operation.

In testimony whereof I hereby affix my signature.

CHARLES E. WAREAM.